(12) United States Patent
Yang et al.

(10) Patent No.: US 10,198,115 B2
(45) Date of Patent: Feb. 5, 2019

(54) TOUCH DISPLAY PANEL, TOUCH DISPLAY DEVICE AND METHOD FOR DRIVING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Xiaochuan Chen, Beijing (CN); Weijie Zhao, Beijing (CN); Yingming Liu, Beijing (CN); Chen Meng, Beijing (CN); Ruijun Dong, Beijing (CN); Rui Xu, Beijing (CN); Wei Liu, Beijing (CN); Changfeng Li, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/325,318

(22) PCT Filed: May 9, 2016

(86) PCT No.: PCT/CN2016/081422
§ 371 (c)(1),
(2) Date: Jan. 10, 2017

(87) PCT Pub. No.: WO2016/197771
PCT Pub. Date: Dec. 15, 2016

(65) Prior Publication Data
US 2018/0088725 A1    Mar. 29, 2018

(30) Foreign Application Priority Data

Jun. 10, 2015    (CN) .......................... 2015 1 0316308

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC .............................. G06F 3/0412; G06F 3/044
See application file for complete search history.

(56) References Cited

U.S. PATENT DOCUMENTS

| 2013/0241913 A1* | 9/2013 | Kim ..................... G09G 3/3208 345/212 |
| 2013/0265244 A1* | 10/2013 | Kim ........................ G06F 3/044 345/173 |

(Continued)

FOREIGN PATENT DOCUMENTS

| CN | 101866228 A | 10/2010 |
| CN | 103049156 A | 4/2013 |

(Continued)

OTHER PUBLICATIONS

International Search Report and Written Opinion for Application No. PCT/CN2016/081422, dated Jul. 26, 2016, 12 Pages.

(Continued)

*Primary Examiner* — Towfiq Elahi
(74) *Attorney, Agent, or Firm* — Brooks Kushman P.C.

(57) ABSTRACT

A touch display panel is provided. The touch display panel includes a first substrate, and a second substrate opposite to the first substrate. The first substrate includes a base substrate, and an anode, an organic light emitting layer and a cathode formed on the base substrate. The cathode includes (Continued)

a plurality of first sub-electrodes, each of the plurality of first sub-electrodes is used as a touch electrode and applied with a touch scanning signal during a touch scanning stage and is used as a common electrode and applied with a common electrode signal during a display stage. The first substrate further includes a driving electrode layer disposed between the anode and the base substrate, the driving electrode layer is applied with the touch scanning signal during the touch scanning stage.

20 Claims, 4 Drawing Sheets

(56) References Cited

U.S. PATENT DOCUMENTS

2014/0210767 A1\* 7/2014 Hur ................ G06F 3/0412
 345/174

2016/0019827 A1\* 1/2016 Lee ................ G09G 3/3208
 345/204

2016/0147342 A1 5/2016 Xiong et al.

FOREIGN PATENT DOCUMENTS

| CN | 103226423 A | 7/2013 |
|---|---|---|
| CN | 103455189 | 12/2013 |
| CN | 103699284 A | 4/2014 |
| CN | 104465703 A | 3/2015 |
| CN | 104657016 A | 5/2015 |
| CN | 104850268 A | 8/2015 |
| WO | 2011114900 A1 | 9/2011 |

OTHER PUBLICATIONS

First Office Action for Chinese Application No. 201510316308.1, dated Aug. 3, 2017, 6 Pages.

\* cited by examiner

TOUCH DISPLAY PANEL, TOUCH DISPLAY DEVICE AND METHOD FOR DRIVING THE SAME

CROSS-REFERENCE TO RELATED APPLICATIONS

This application is the U.S. national phase of PCT Application No. PCT/CN2016/081422 filed on May 9, 2016, which claims priority to Chinese Patent Application No. 201510316308.1 filed on Jun. 10, 2015, the disclosures of which are incorporated in their entirety by reference herein.

TECHNICAL FIELD

The present disclosure relates to the field of touch display, and in particularly to a touch display panel, a touch display device and a method for driving the same.

BACKGROUND

With the rapid development of the display technology, touch panels have been widely used in people's lives. Currently, depending on the structure, the touch panels may be classified into add on mode touch panels, on cell touch panels and in cell touch panels. For the add on mode touch panel, the touch panel and a liquid crystal display (LCD) panel are produced separately, and then attached together so as to form the LCD panel having a touch function. However, there exist some drawbacks in the add on mode touch panel, such as high manufacturing cost, low light transmittance and a thick module. For the in cell touch panel, a touch electrode of the touch panel is built inside the LCD panel so as to reduce the overall thickness of the module and remarkably reduce its manufacturing costs. Thus the in cell touch panel is favored by the major manufacturers.

At present, the existing in cell touch screens primarily detect the touch position of a finger according to the principle of the self-capacitance. In implementation, the thin film transistor (TFT) array substrate is provided with additional touch electrodes. Due to the above-mentioned structure design of the in cell touch panel, it is necessary to add a new film layer (the transparent conductive layer serving as a touch electrode) on the existing TFT array substrate, so that a new process needs to be added during manufacturing of the TFT array substrate and the production costs are increased, it does not facilitate improvement of the production efficiency.

SUMMARY

The present disclosure aims to provide a touch display panel, a touch display device and a method for driving the same, so as to reuse the cathode as the touch electrode in the touch scanning stage and eliminate the potential interference of the anode to the cathode in the touch scanning stage.

To this end, the present disclosure provides a touch display panel including a first substrate and a second substrate opposite to the first substrate. The first substrate includes a base substrate, and an anode, an organic light emitting layer and a cathode formed on the base substrate. The cathode includes a plurality of first sub-electrodes, each of the plurality of first sub-electrodes is used as a touch electrode and applied with a touch scanning signal during a touch scanning state; and is used as a common electrode and applied with a common electrode signal during a display stage. The first substrate further includes a driving electrode layer disposed between the anode and the base substrate, the driving electrode layer is applied with the touch scanning signal during the touch scanning stage.

In some embodiments, the touch display panel further includes a driving integrated circuit (IC), configured to generate the touch scanning signal and the common electrode signal in a time division manner, each of the plurality of first sub-electrodes of the cathode is connected with the driving IC through a first wire.

In some embodiments, the touch display panel further includes a thin film transistor, located between the anode and the base substrate and comprising a gate electrode, a source electrode and a drain electrode, the driving electrode layer is disposed between the thin film transistor and the base substrate.

In some embodiments, the first wire is formed of a same material and at a same layer as the first sub-electrodes of the cathode, and is formed in a gap between the first sub-electrodes.

In some embodiments, the first wire is disposed in a layer under the first sub-electrode of the cathode.

In some embodiments, the first wire comprises a first sub-wire and a second sub-wire, the first sub-wire is connected with the driving IC, and the second sub-wire connects the first sub-electrode and the first sub-wire.

In some embodiments, the first sub-wire is formed of a same material as a data line.

In some embodiments, the first sub-wire is formed at a same layer and of a same material as the gate electrode.

In some embodiments, the first sub-wire is formed at a same layer and of a same material as the source electrode and the drain electrode.

In some embodiments, the second sub-wire penetrates a layer between the first sub-wire and the first sub-electrode.

In some embodiments, the anode includes a plurality of second sub-electrodes having gaps therebetween, and the first sub-wire is formed at a same layer and of a same material as the anode and is formed in the gap between the second sub-electrodes.

In some embodiments, the anode includes a plurality of second sub-electrodes having gaps therebetween, the first sub-wire is formed at a same layer and of a same material as the gate electrode or as the source electrode and drain electrode of the thin film transistor, and a position where the first wire penetrates a layer at which the anode exists is in the gap between the second sub-electrodes.

In addition, another aspect of the present disclosure further provides a touch display device comprising the above-mentioned touch display panel.

In addition, another aspect of the present disclosure further provides a method for driving the above-mentioned touch display device. The method includes: applying the common electrode signal to each of the plurality of first sub-electrodes of the array substrate when the touch display device is operated during the display stage; and applying the touch scanning signal to each of the plurality of first sub-electrodes and the driving electrode layer of the array substrate when the touch display device is operated during the touch scanning stage.

The above-mentioned technical solutions of the present disclosure have the following advantages: the cathode in the touch display panel is reused as a touch electrode so that the structure of the array substrate is simplified, and a driving electrode layer is disposed opposite to the cathode, the driving electrode layer and the cathode are applied with a touch scanning signal so that the potential interference of the anode to the cathode is eliminated in the touch scanning stage, making it possible to reuse the cathode as the touch electrode.

DETAILED DESCRIPTION

Unless otherwise defined, technical or scientific terms used herein shall have the ordinary meanings as understood by a person of ordinary skills in the art to which the present disclosure belongs. The words "first," "second," and the like as used in the specification and claims of the present disclosure do not denote any order, amount or importance, but are merely used to distinguish different constituent parts. Similarly, the words "a" or "an" and the like are merely used to represent the existence of at least one member, rather than to limit the number thereof. The words "connect" or "connected" and the like are not limited to physical or mechanical connections, but may include electrical connections, whether direct or indirect. The words "on", "under", "left" and "right" and the like are merely used to indicate relative position relationships, and when an absolute position of the described object changes, the relative position relationships changes accordingly.

The following detailed description will be made in conjunction with accompanying drawings and embodiments, so as to make the technical problem to be solved, technical solutions and advantages of the present disclosure clearer.

The present disclosure provides a touch display panel having a new in cell touch screen structure. A cathode, which serves as a common electrode, is reused as the touch electrode so as to simplify the structure, reduce the manufacturing processes of the touch display panel and reduce the manufacturing costs.

Figure 1:
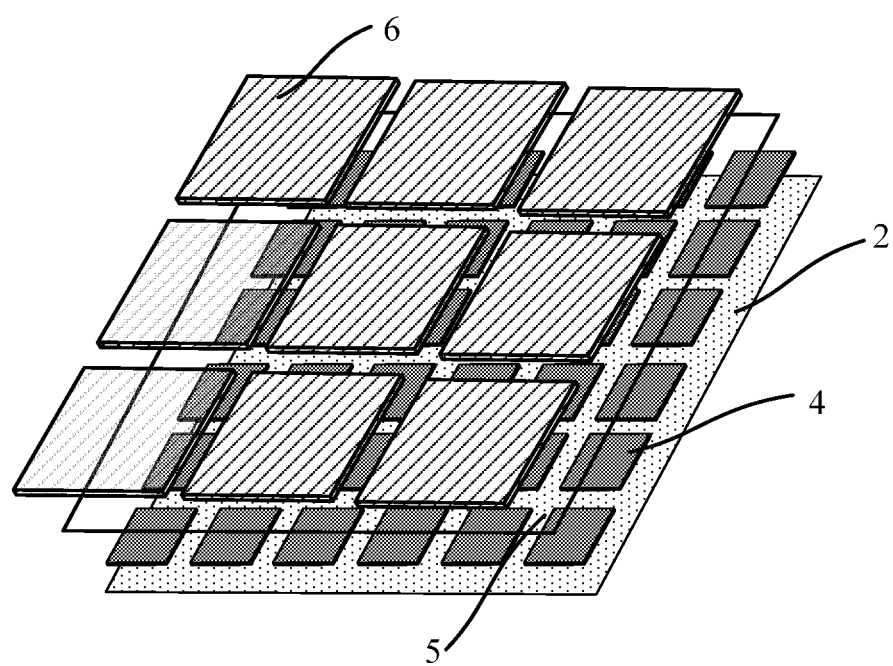
FIG. 1 illustrates a schematic diagram of a touch display panel according to at least one embodiment of the present disclosure.

The touch display panel of at least one embodiment of the present disclosure includes: an array substrate (i.e. first substrate) and a color filter substrate (i.e. second substrate) opposite to the array substrate. As shown in FIG. 1, the array substrate specifically includes: a base substrate (not shown in FIG. 1); an anode 4, an organic light emitting layer 5 and a cathode 6 formed on the based substrate (the anode 4, organic light emitting layer 5 and cathode 6 are collectively referred to as a light emitting diode structure); and a driving electrode layer 2 disposed between the anode 4 and the base substrate. The cathode 6 includes a plurality of first sub-electrodes. Each of the first sub-electrodes serves as a touch electrode and is applied with a touch scanning signal during a touch scanning stage, and serves as a common electrode and is applied with a common electrode signal during a display stage. During the touch scanning stage, the driving electrode layer 2 and the cathode 6 are applied with the touch scanning signal.

In the touch display panel of the embodiment of the present disclosure, the cathode electrode on the array substrate is formed into a touch electrode pattern and a touch scanning signal and a common electrode signal are transmitted in a time division manner so that a display function and a touch function can be achieved in the time division manner in a unit time frame. Further, during the touch scanning stage, the cathode is applied with the touch scanning signal, and there is no signal on the anode, so the anode acts as a ground capacitance to pull down the high potential on the cathode, thus affecting the touch detection accuracy. In order to avoid this phenomenon, in the present embodiment, a driving electrode layer corresponding to the cathode is added under the anode, the driving electrode layer and the cathode are applied with the touch scanning signal so that there is no potential difference between the cathode and the driving electrode layer, thereby eliminating the interference of the anode.

The array substrate of the present embodiment further includes: a thin film transistor.

In the related art, the anode of the array substrate receives a data signal from the drain electrode of the thin film transistor. Alternatively, in the present embodiment, the driving electrode layer is arranged under the thin film transistor to avoid additional holes in the driving electrode layer and allow wires connecting the anode and the drain to pass therethrough.

In particular, the touch display panel of the present embodiment further includes a driving integrated circuit (IC). The above-mentioned touch-scanning signal and the common electrode signal are generated by the driving IC in the time division manner. That is, each of the first sub-electrodes of the cathode of the present embodiment is connected with the driving IC by a first wire, so as to apply the touch-scanning signal and the common electrode signal from the driving IC.

Figure 2:
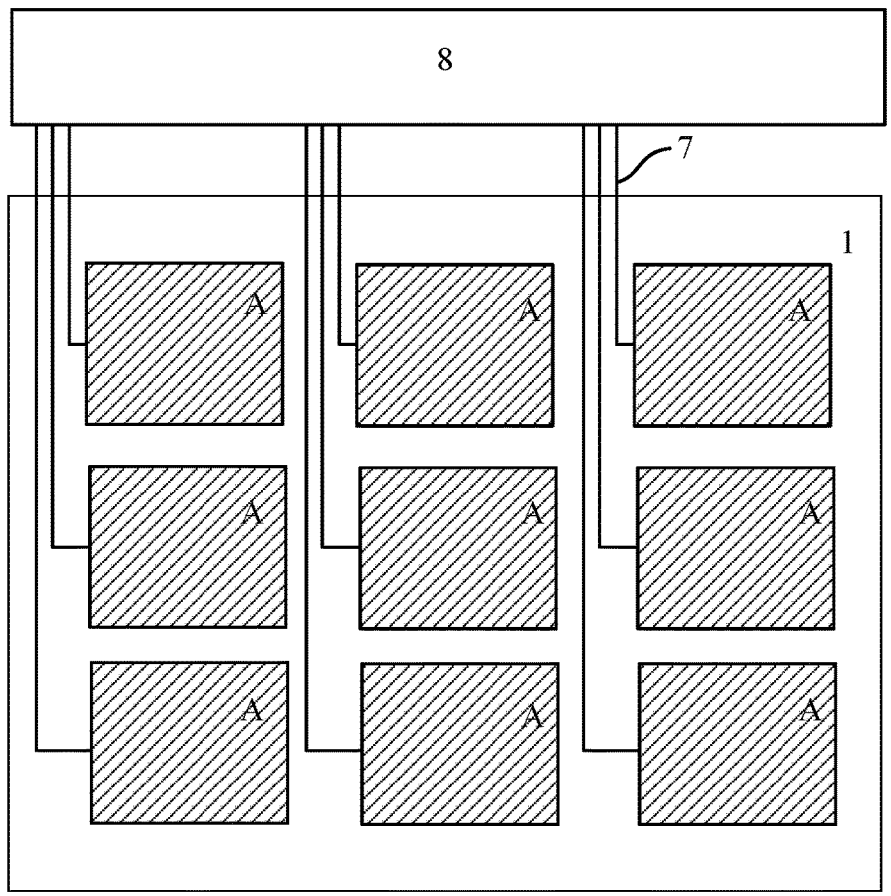
FIGS. 2-7 illustrate schematic diagrams of the touch display panels according to different embodiments of the present disclosure.

In a particular implementation, in order to avoid additional patterning processes, the first wire may be formed at the same layer and of the same material as the first sub-electrode. As shown in the touch display panel structure of FIG. 2, the first wire 7 on the base substrate 1 may be disposed in a gap between the first sub-electrodes A and connected to the driving IC 8.

Optionally, as another embodiment, the first wire and the first sub-electrode may be disposed in different layers when taking in consideration that the distance between the first sub-electrodes is increased by the first wire disposed in the gap between the first sub-electrodes, which affects the touch detection accuracy, and that the change of the self-capacitance is interfered to some extent since the first wire and the first sub-electrode are disposed in the same layer. Certainly, it is possible to dispose the first wire in a layer above the first sub-electrode or under the first sub-electrode. However, disposing the first wire in the layer above the first sub-electrode will increase the layers of the array substrate. Therefore, as a preferred solution, in the present embodiment, the first wire is disposed in an original layer under the cathode in order to avoid a complicated structure of the array substrate.

The scheme in which the first wire is disposed in the layer under the cathode will be described in detail in conjunction with the following embodiments.

<First Embodiment>

Figure 3:
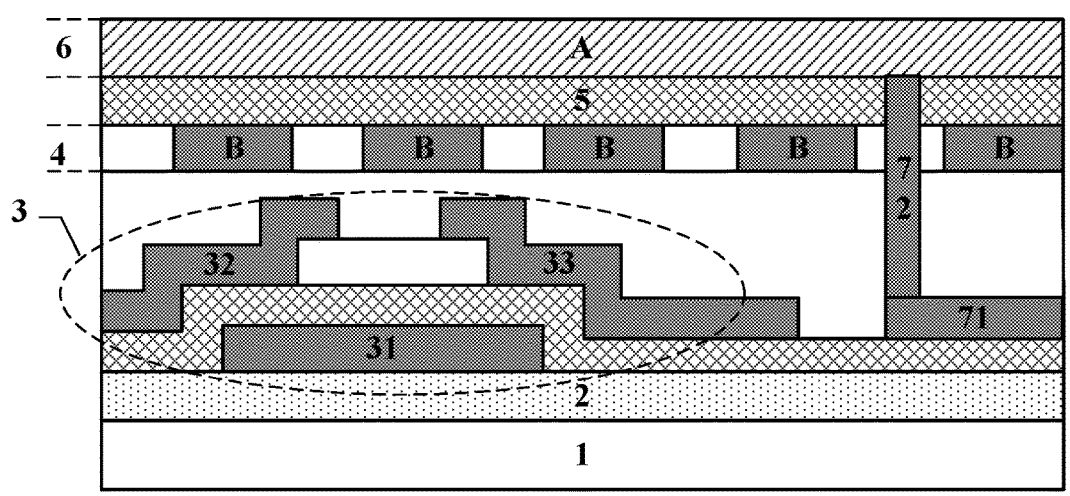
Figure 4:
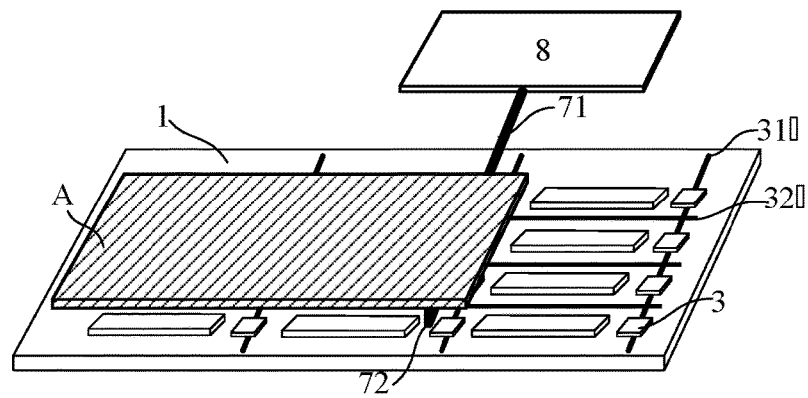

As shown in FIG. 3, in the first embodiment, the array substrate of the touch display panel includes: a thin film transistor 3 formed on the base substrate 1. As an exemplary illustration, the thin film transistor 3 has a bottom gate structure and includes a gate electrode 31, a source electrode 32, and a drain electrode 33. As shown in FIG. 4, the gate electrode 31 is connected to the gate line 31', and the source electrode 32 is connected to the data line 32'.

The anode 4 is located above the thin film transistor 3, and includes a plurality of second sub-electrodes B, and a gap exists between any two second sub-electrodes B.

The organic light-emitting layer 5 is disposed between the anode 4 and the cathode 6.

Further referring to FIG. 4, in the first embodiment, the first sub-electrode A is connected to the driving IC 8 through the first wire including a first sub-wire 71 and a second sub-wire 72.

The first sub-wire 71 is directly connected to the driving IC 8 and is patterned with the data line 32' through the same conductive material layer (the first sub-wire 71 may be formed at the same layer and of the same material as the source electrode 32 and the drain electrode 33). The second sub-wire 72 penetrates the layer(s) between the first sub-wire 71 and the first sub-electrode A, and connects the first sub-electrode A and the first sub-wire 71. Further referring to FIG. 3, the position where the second sub-wire 72 penetrates the layer at which the anode 4 exists is in the gap between the second sub-electrodes B.

Figure 5:
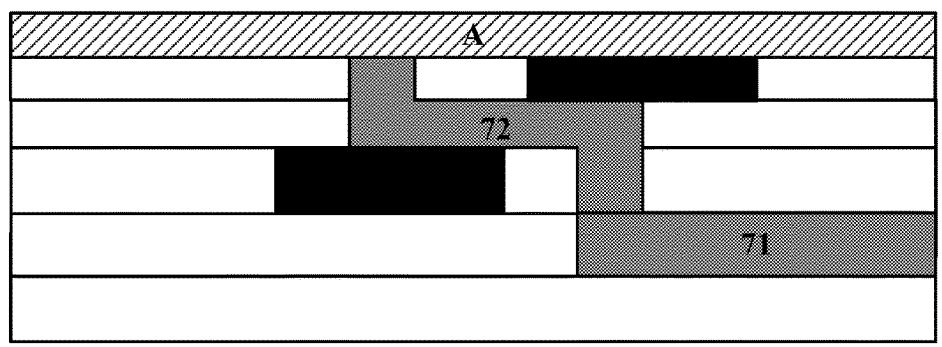

The above is the array substrate of the first embodiment. It should be noted that in the practical structure, the second sub-wire 72 is not necessarily formed by depositing after passing through the via hole between the first sub-electrode A and the first sub-wire 71. The second sub-wire 72 may be divided into several portions based on the layers and these portions are produced separately. In a practical application, the second sub-wire 72 does not necessarily have the vertical structure as shown in FIG. 3, but may be formed as shown in FIG. 5 to bend between the layers so that the path can bypass other functional patterns (the black rectangle in the figures represent other functional patterns).

It can be seen in the first embodiment, the first wire (71 and 72) is formed on the original layer of the array substrate, which will not complicate the structure of the array substrate. In addition, a part of the first wire (i.e. the first sub-wire 71) is formed of the same conductive material layer as the data line 32', thereby avoid the addition of patterning processes to some extent and reducing the material costs.

<Second Embodiment>

Figure 6:
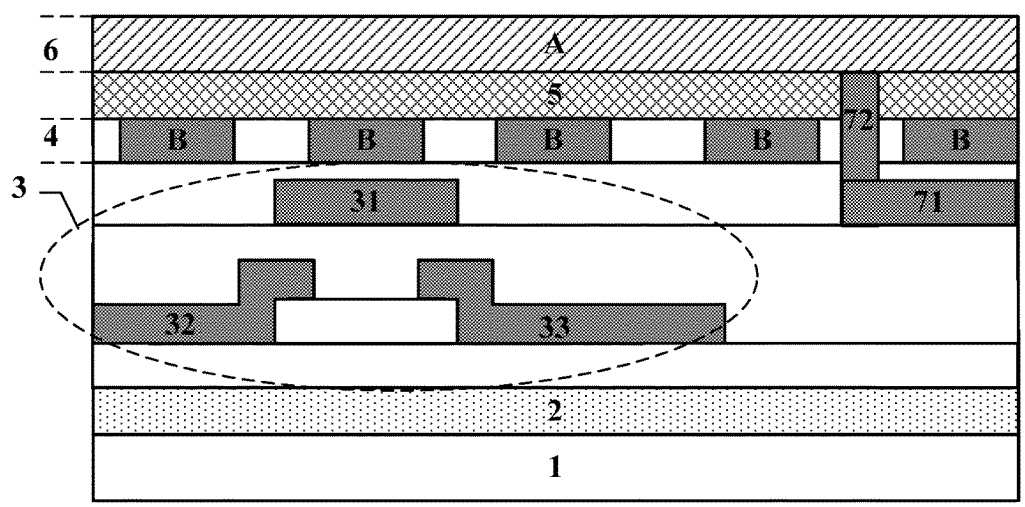

As shown in FIG. 6, unlike the first embodiment, the thin film transistor 3 of the array substrate of the second embodiment has a top gate structure.

The first sub-wire 71 is formed of the same material and at the same layer as the gate electrode 31, and is directly connected to the driving IC 8. The second sub-conductor 72 penetrates the layers between the first sub-wire 71 and the first sub-electrode A (e.g., the organic light emitting layer 5 and the layer of the anode 4) and connects the first sub-electrode A and the first sub-wire 71.

As in the first embodiment, the first wire (71 and 72) of the second embodiment is formed on the original layer of the array substrate. Therefore, compared with the existing array substrate, the structure is not made more complicated.

<Third Embodiment>

Figure 7:
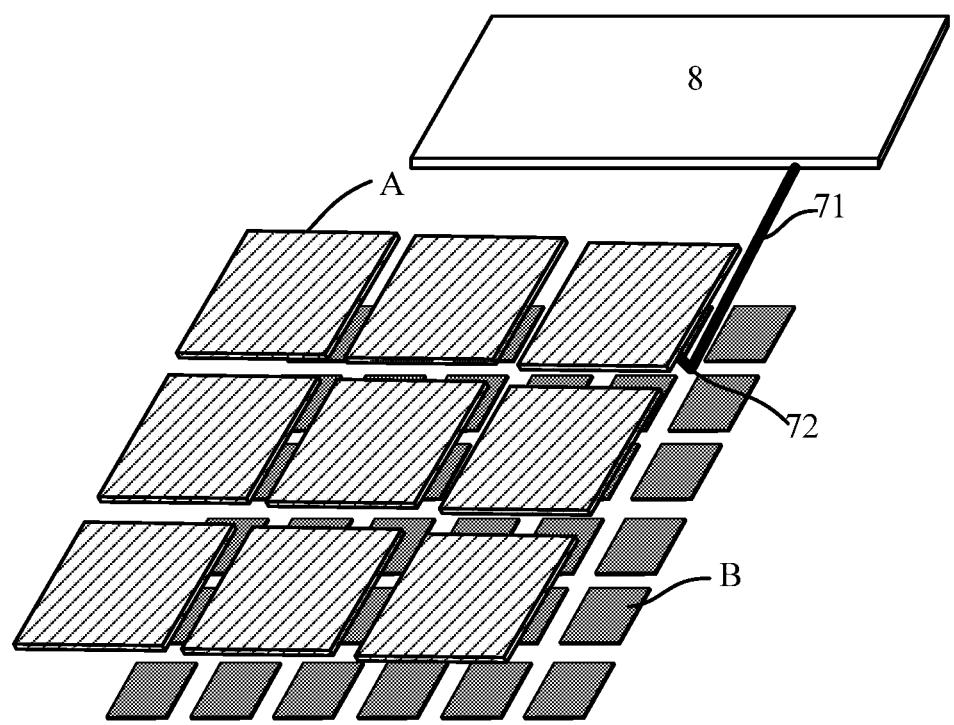

As shown in FIG. 7, in the array substrate of the third embodiment, the first wire connecting the first sub-electrode A and the driving IC 8 includes: a first sub-wire 71 formed of the same material and at the same layer as a second sub-electrode B in the anode, the first sub-wire 71 directly connected to the driving IC; a second sub-wire 72 connecting the first sub-electrode A and the first sub-wire 71, the second sub-wire 72 penetrating the layer(s) between the first sub-electrode A and the first sub-wire 71 (e.g. the organic light emitting layer).

The first wire (71 and 72) of the third embodiment is also formed on the original layer of the array substrate. Therefore, compared with the existing array substrate, the structure is not made more complicated.

As can be understood from the second to fourth embodiments described above, any conductive pattern between the cathode and the driving electrode layer may be formed from the same conductive material layer as a part of the first wire.

In summary, in the touch display panel of the present embodiment, the cathode of the array substrate is reused as the touch electrode, thereby simplifying the structure of the array substrate. The driving electrode layer corresponding to the cathode is provided, and the touch scanning signal is simultaneously applied to the cathode and the driving electrode layer, so that the potential interference of the anode to the cathode is eliminated during the touch scanning stage, thereby making it possible to reuse the cathode as the touching electrode. In addition, at least a part of the wires of the driving IC and the cathode may share the same material layer with the conductive pattern between the cathode and the driving electrode, thereby simplifying the structure of the array substrate and reducing the complexity of the manufacturing process.

In addition, another embodiment of the present disclosure further provides a touch display device including the above-mentioned touch display panel. The cathode is reused as the touch electrode through a conductive pattern layer, thereby simplifying the structure of the touch display device.

Correspondingly, with respect to the above-mentioned touch display device, yet another embodiment of the present disclosure further provide a method for driving the touch display device. The method includes two driving stages for a screen displaying operation and a user touch scanning operation: a displaying stage and a touch scanning stage.

When the touch display is operated during the displaying stage, a common electrode signal is applied to each of the first sub-electrodes of the array substrate; and when the touch display is operated during the touch scanning stage, a touch scanning signal is applied to each of the first sub-electrodes of the array substrate and the driving electrode layer of the array substrate.

It can be understood from the above description that the driving method of the present embodiment is different from the related art in that the touch scanning signal is simultaneously applied to the driving electrode layer and functional patterns which can function as both the cathode and the touch electrode during the touch scanning stage, thereby eliminating the potential interference of the anode to the cathode.

The above-mentioned embodiments are merely optional embodiments of the present disclosure. It should be noted that improvements and modifications may be made by those skilled in the art without departing from the technical principles of the present disclosure. These improvements and modifications should also be considered within the scope of protection of the present disclosure.

What is claimed is:

1. A touch display panel, comprising a first substrate and a second substrate opposite to each other, wherein
the first substrate comprises a base substrate; and an anode, an organic light emitting layer and a cathode formed on the base substrate,
the cathode comprises a plurality of first sub-electrodes, each of the plurality of first sub-electrodes is used as a touch electrode and applied with a touch scanning signal during a touch scanning stage and is used as a common electrode and applied with a common electrode signal during a display stage, and
the first substrate further comprises a driving electrode layer and a thin film transistor, the thin film transistor is located between the anode and the base substrate, and comprises a gate electrode, a source electrode and a drain electrode, the driving electrode layer is applied with the touch scanning signal during the touch scanning stage, the driving electrode layer is disposed between the gate electrode of the thin film transistor and the base substrate, and the driving electrode layer is in direct contact with the gate electrode of the thin film transistor.

2. The touch display panel according to claim 1, further comprising:

a driving integrated circuit (IC), configured to generate the touch scanning signal and the common electrode signal in a time division manner, wherein each of the plurality of first sub-electrodes of the cathode is connected with the driving IC through a first wire.

3. The touch display panel according to claim 2, wherein the first wire is formed at a same layer and of a same material as the first sub-electrodes of the cathode, and is formed in a gap between the first sub-electrodes.

4. The touch display panel according to claim 2, wherein the first wire is disposed in a layer under the first sub-electrode of the cathode.

5. The touch display panel according to claim 4, wherein the first wire comprises a first sub-wire and a second sub-wire, the first sub-wire is connected with the driving IC, and the second sub-wire connects the first sub-electrode and the first sub-wire.

6. The touch display panel according to claim 5, wherein the first sub-wire is formed of a same material as a data line.

7. The touch display panel according to claim 5, wherein the first sub-wire is formed at a same layer and of a same material as the gate electrode.

8. The touch display panel according to claim 5, wherein the first sub-wire is formed at a same layer and of a same material as the source electrode and the drain electrode.

9. The touch display panel according to claim 5, wherein the second sub-wire penetrates a layer between the first sub-wire and the first sub-electrode.

10. The touch display panel according to claim 5, wherein the anode comprises a plurality of second sub-electrodes having gaps therebetween, and the first sub-wire is formed at a same layer and of a same material as the anode, and is formed in the gap between the second sub-electrodes.

11. The touch display panel according to claim 8, wherein the anode comprises a plurality of second sub-electrodes having gaps therebetween, and a position where the first wire penetrates a layer at which the anode exists is in the gap between the second sub-electrodes.

12. A touch display device, comprising the touch display panel according to claim 1.

13. A method for driving the touch display device according to claim 12, comprising:

applying the common electrode signal to each of the plurality of first sub-electrodes of the first substrate in response to the touch display device being operated during the display stage; and applying the touch scanning signal to each of the plurality of first sub-electrodes and the driving electrode layer of the first substrate in response to the touch display device being operated during the touch scanning stage.

14. The touch display device according to claim 12, further comprising:

a driving integrated circuit (IC), configured to generate the touch scanning signal and the common electrode signal in a time division manner, wherein each of the plurality of first sub-electrodes of the cathode is connected with the driving IC through a first wire.

15. The touch display device according to claim 14, wherein the first wire is formed at a same layer and of a same material as the first sub-electrodes of the cathode, and is formed in a gap between the first sub-electrodes.

16. The touch display device according to claim 14, wherein the first wire is disposed in a layer under the first sub-electrode of the cathode.

17. The touch display device according to claim 16, wherein the first wire comprises a first sub-wire and a second sub-wire, the first sub-wire is connected with the driving IC, and the second sub-wire connects the first sub-electrode and the first sub-wire.

18. The touch display device according to claim 17, wherein the first sub-wire is formed of a same material as a data line.

19. A touch display panel comprising:

a first substrate and a second substrate opposite to each other;

the first substrate comprising a base substrate, an anode, an organic light emitting layer and a cathode formed on the base substrate, the cathode comprising a plurality of first sub-electrodes, each of the first sub-electrodes comprising a touch electrode applied with a touch scanning signal during a touch scanning stage and comprising a common electrode applied with a common electrode signal during a display stage, the first substrate further comprising a driving electrode layer and a thin film transistor, the thin film transistor disposed between the anode and the base substrate, the thin film transistor comprising a gate electrode, a source electrode and a drain electrode, the driving electrode layer applied with the touch scanning signal during the touch scanning stage, the driving electrode layer disposed between the gate electrode and the base substrate, and the driving electrode layer is in direct contact with the gate electrode of the thin film transistor.

20. The touch display panel according to claim 1, further comprising:

a driving integrated circuit (IC), configured to generate the touch scanning signal and the common electrode signal in a time division manner, wherein each of the plurality of first sub-electrodes of the cathode is connected with the driving IC through a first wire.

* * * * *